July 13, 1948. P. HOFFMAN 2,445,176
FLUSH PIN INDICATOR
Filed Nov. 11, 1943 2 Sheets-Sheet 2

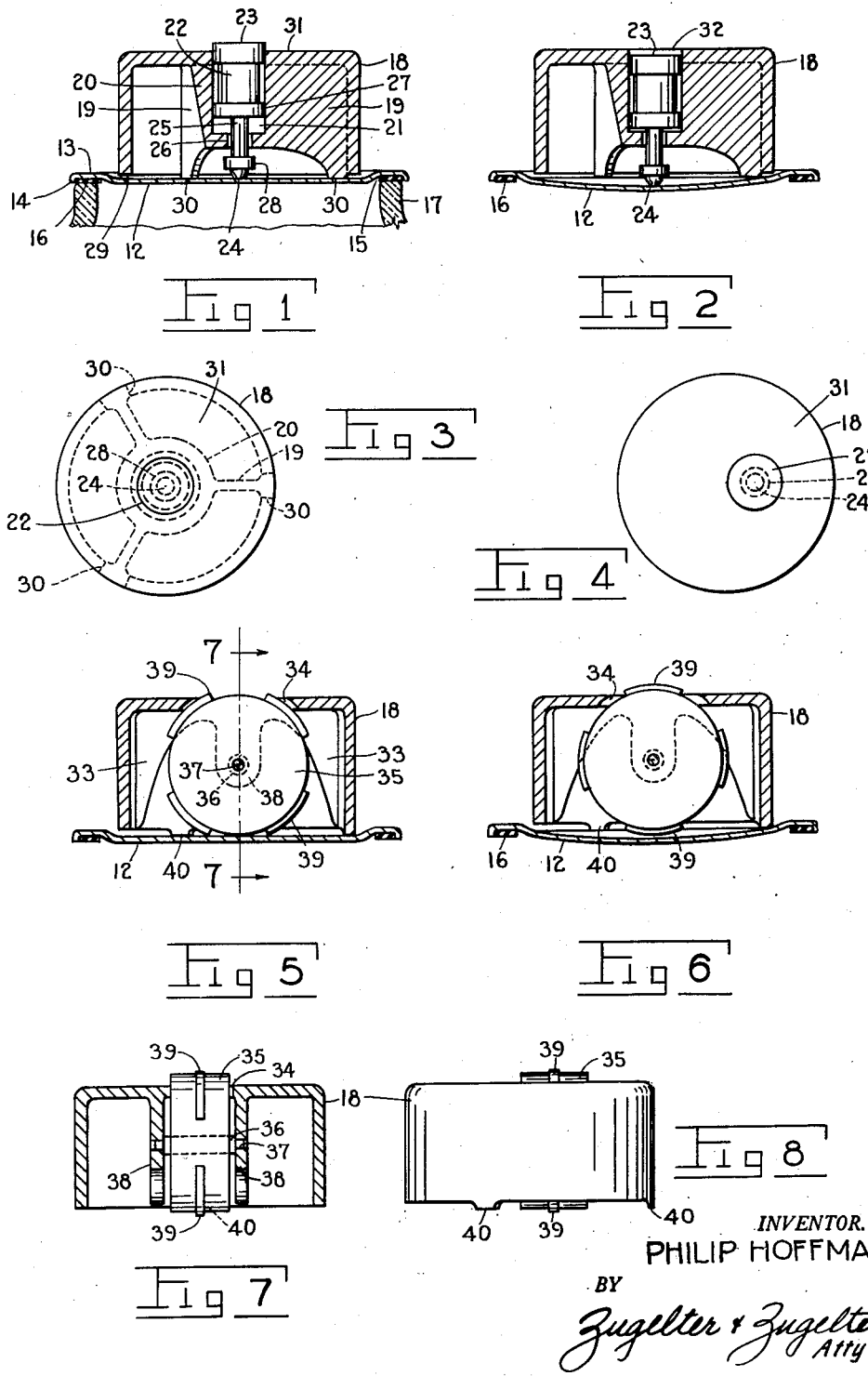
July 13, 1948.  P. HOFFMAN  2,445,176
FLUSH PIN INDICATOR
Filed Nov. 11, 1943  2 Sheets-Sheet 1
INVENTOR.
PHILIP HOFFMAN
BY
Zugelter & Zugelter
Att'ys.

INVENTOR.
PHILIP HOFFMAN
BY
Zugelter & Zugelter
Atty's.

Patented July 13, 1948

2,445,176

UNITED STATES PATENT OFFICE 2,445,176

FLUSH PIN INDICATOR

Philip Hoffman, Mount Healthy, Ohio

Application November 11, 1943, Serial No. 509,886

6 Claims. (Cl. 33—169)

The present invention relates to an indicator, and is adapted particularly for use in determining whether or not the containers of vacuum packed foods and the like are properly sealed to prevent spoilage. In the form disclosed herein, the implement has been so designed and constructed as to be very inexpensive, and simplified to the extent that any person interested in the home canning of fruits, vegetables, and other commodities, will find the implement highly useful, durable, and dependable for its intended purpose.

The device is adapted for placement upon the flexible lid of a container, after the container has cooled subsequently to being filled with hot food, so as to indicate a concaved condition of the lid resulting from the presence of a normal vacuum within the container. If the vacuum necessary to prevent spoilage is absent, the lid will not present a substantial concave upper surface, but will present instead a generally flat upper surface which the implement of the invention will indicate as unsafe for the preservation of any food packed within the container. Improperly sealed or leaky containers may thereby be quickly segregated from the others, and their contents either repacked, or used prior to spoilage.

One of the principal objects of the instant invention is to provide an implement of the character stated which is simple, inexpensive, durable, and reliable as an indicator of safely canned vacuum packed foods.

Another object of the invention is to provide such an implement as will withstand considerable abuse, and the deteriorating effects of acid, caustic, and other corrosion inducive materials ordinarily encountered in the canning or packing of foods to be preserved.

Another object is to provide for maximum convenience and accuracy in the use of an implement of the character referred to, while at the sametime retaining the various advantages and desirable features previously mentioned.

The foregoing and other objects are attained by the means described herein and disclosed in the accompanying drawings, in which:

Fig. 1 is a vertical cross-sectional view of the implement showing its application to the lid of a container, no vacuum being indicated.

Fig. 2 is a view similar to Fig. 1, showing application of the indicator to the lid of a properly sealed container, the lid being accordingly concave at its upper or outer face.

Fig. 3 is a top plan view of the indicator.

Fig. 4 is a top plan view of a modification.

Fig. 5 is a vertical cross-sectional view of a second form of indicator, applied to a flat lid.

Fig. 6 is a view similar to Fig. 5, showing the modified form of device applied to a concave lid.

Fig. 7 is a cross-sectional view taken on line 7—7 of Fig. 5, the lid being omitted.

Fig. 8 is an elevational view of a modification of Fig. 7.

In the canning or packing of food and the like, it has been common practice to introduce the food in heated condition, into a jar or other container and then immediately apply a sealing lid to the mouth of the jar or container so that the vacuum produced upon cooling of the contents will hold the lid in sealing relationship with the annular edge of the container mouth. In some instances the lids are screw-threaded onto the container, whereas in others the lid is retained by the force of the vacuum created within the container, aided by such adhesive qualities as may be present in a sealing compound located intermediate the container mouth and the marginal sealing area of the lid. The latter type of lid is illustrated at 12 in the accompanying drawings, and is the type with which the present invention is concerned.

The lid referred to, and of which the well known Kerr lid is an example, comprises a disc of flexible material which usually is substantially flat in appearance, although its periphery may be slightly raised as at 13 to provide a downwardly turned annular lip 14 and an adjacent annular under surface or marginal portion 15 carrying a sealing compound indicated at 16. The sealing compound may be of any known type which is capable of effecting a leakproof annular seal along the annular upper edge or mouth portion of a jar or other container 17.

Figure 9:
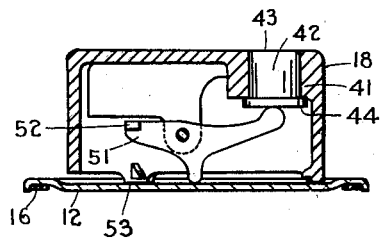
Fig. 9 is a vertical cross-sectional view of a second modification, taken on line 9—9 of Fig. 11, the indicator illustrated being applied to a flat lid.
Figure 10:
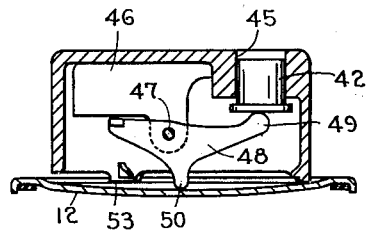
Fig. 10 is a view similar to Fig. 9, showing the device of Fig. 9 applied to a concave lid.

Customarily, the lid described is applied to the jar or container while the latter is hot and contains hot foodstuff to be preserved, and during the cooling period the lid is held tightly upon the container mouth, by mechanical means not necessary to here describe, until the vacuum produced within the container has developed sufficiently to hold the lid in place. If the resultant seal is perfect, or satisfactory for preservation of the material sealed thereby, the lid will assume a concave configuration as illustrated by Figs. 2, 6 and 10 of the accompanying drawings, whereas if the seal is leaky or imperfect, the lid will remain or become substantially flat, as in its initial condition, as illustrated by Figs. 1, 5 and 9.

From the foregoing it will be understood that the invention involves the thought of quickly and accurately indicating either of the two lid conditions, as indicative of perfectly or imperfectly sealed containers. While the device herein disclosed is particularly applicable to the testing of containers used in home canning, it is obvious that canning or vacuum packing of commodities on a commercial scale may likewise be benefited by the use of the device. It is wholly immaterial to the invention whether the sealing lid be of light gauge metal, as is usual, or of some other material suitable for the purpose. The only requirement is that the lid be subject to distortion with the formation of a concavity in its upper surface, under the force of the vacuum within the jar or container to be sealed. The material of which the jar or container is constructed, is a matter of immateriality to the invention.

Referring to Fig. 1, 18 indicates a body constructed of any suitable material, preferably a plastic, and which for convenience may be made cylindrical in shape. The body may be hollow, and may be provided with a series of integral ribs or struts 19 radiating from a boss 20 formed at or near the center of the body. The boss is bored longitudinally as at 21, and is adapted to support for reciprocation a feeler element or indicating member 22 which in the embodiment illustrated, is of plunger or pin form. The part 22 has a head end 23 and an opposite end 24, the latter being adapted to rest upon the upper or outer surface of the lid 12. The reduced portion 25 of element 22 may extend freely through an opening 26 formed in the base of the boss. Reciprocating movement of the plunger may be limited by shoulder 27 and collar 28, as is obvious.

In order that the body may rest upon lid 12 without rocking, the lower annular edge 29 of the body may be provided with three short legs indicated at 30, thereby to establish a tripod effect ensuring proper setting of the body upon the upper surface of the lid.

By comparing the illustrations of Figs. 1 and 2, it will be noted that the contact end 24 of the plunger, in contacting a normal or flat lid, causes the head end of the plunger to extend slightly above the flat top 31 of the body, thereby indicating lack of a concavity in the upper surface of the lid. On the other hand, when the lid is concaved as shown in Fig. 2, the head end of the plunger will be disposed slightly below the plane of the body top, thereby indicating the presence of the concavity, and consequently the establishment of a perfect or satisfactory seal between the lid and the container. Since in most instances the differences in elevation of the plunger are very slight, the upper annular edge 32 of bore 21 is made sharp, as is also the upper annular end at the head of the plunger, for by means of this arrangement the sense of touch may be relied upon to indicate the condition of the lid, by merely passing the finger across the top of the plunger and the body surface 21. The ribs or struts 19 not only support the boss 20, but they serve also to strengthen the body 18 and prevent distortion thereof.

As illustrated by Fig. 3, the plunger and its contact end 24 are disposed centrally of the body, where the greatest deflection of the lid occurs. It is to be distinctly understood, however, that the boss 20 may be disposed slightly to one side of the vertical axis of the body, as illustrated by Fig. 4, to avoid interference with the test in the event that the center portion of a lid be embossed with ornamentation or lettering. The modified form of device illustrated by Fig. 4 is structurally the same as that illustrated by Figs. 1, 2, and 3, except for the offset location of the plunger and its contactor 24.

In the modified form illustrated by Figs. 5–7 inclusive, the body 18 is provided with parallel strengthening ribs or struts 33 spaced apart beneath a slot 34 in the top of the body, to receive a feeler element or indicating member in the form of a wheel or disc 35. The wheel or disc is rotatably supported upon an axle 36, the ends of which are journaled in perforations 37 provided in the spaced and parallel depending ears 38 within the hollow interior of the body. The disc or wheel carries a series of spaced peripheral lugs or projections 39 which preferably are narrower than the wheel or disc so as to make contact with the lid over a restricted area. To use the device incorporating the wheel or disc, the body 18 is placed upon lid 12 as explained in connection with Fig. 1, and if the lid be flat or without a substantial concavity, it will be struck by the lugs or projections of the wheel, thereby making it difficult to rotate the wheel by applying the finger to the wheel at the top of the body. On the other hand, if the lid be concave as illustrated by Fig. 6, the lugs or projections will be free of contact with the lid, whereupon the wheel may be easily spun, and so indicate the presence of a perfect or satisfactory seal between the lid and the container. This form of the device, like the form illustrated by Fig. 1, may include the small tripod legs or feet as indicated at 40, to prevent rocking of the body relative to the lid.

The device as illustrated by Fig. 8 is structurally the same as that of Figs. 5, 6 and 7, except for the offset location of wheel or disc 35 to one side of the vertical axis of body 18. Offsetting of the wheel or disc is for the purpose of precluding interference with the test in the event that the lid be embossed upon its upper surface. It will be noted that the operation of the modified form of device depends upon the sense of touch incident to the effort to rotate the wheel or disc 35 under the different lid conditions.

Figure 11:
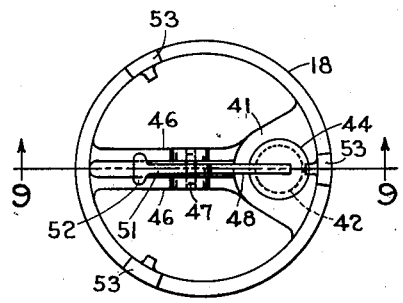
Fig. 11 is a bottom view of the device illustrated by Figs. 9 and 10, the lid being omitted.

Referring now to Figs. 9, 10 and 11, it will be observed that the body 18 includes a boss 41 which is offset from the vertical axis of the body, and bored vertically to accommodate a feeler element or indicating member in the form of a plunger or pin 42 having an upper surface 43 and a lower flange or shoulder 44. Upward movement of the plunger or pin is limited by the flange or shoulder, but the member may descend within the bore 45 of the boss as illustrated by Fig. 10. A pair of ribs or struts 46 may extend across the interior of the body, as shown in Fig. 11, and may support between them a pivot pin or axle 47 upon which is pivoted a rocker arm or lever 48. The rocker arm has a free end 49 serving as a plunger actuator which is located at a considerable distance from the rock shaft or pivot 47. At a lesser distance from said shaft or pivot, a downward projection or finger 50 is provided so as to serve as a contactor adapted to rest upon the upper surface of lid 12. By locating the contactor 50 slightly to one side of a vertical plane passing through the rock shaft 47, and disposing the plunger actuator 49 at a greater distance from said plane, movements of the contactor are multiplied as they are transmitted to the plunger 42 by the rocker arm. In this manner, the plunger movements may be augmented and rendered more clearly observable as the device is applied to lids in either the flat condition or the concave condition, as illustrated by Figs. 9 and 10 respectively. The upper annular edge of bore 45, and the corresponding upper edge of the plunger, preferably are made sharp as was explained in connection with Figs. 1-4, for the purpose of facilitating an appreciation of the plunger location within the bore.

The rocker arm or lever 48 may include a rearward extension 51 carrying a transverse stop or abutment 52 adapted to strike the struts or ribs 46 and thereby limit rocking movement of the arm or lever in one direction about its pivot. By so limiting rocking of the arm or lever in clockwise direction, the plunger 42 is precluded from leaving the bore 45 in which it reciprocates.

Figure 12:
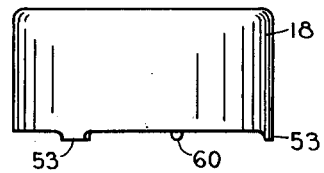
Fig. 12 is a side elevational view of a modification of Fig. 9.

In the view Fig. 12 is shown the device of Figs. 9, 10 and 11, involving the identical arrangement of elements, with the exception that the projection or contactor 60, corresponding to that at 50, is disposed in offset relationship to the vertical axis of body 18, this being for the purpose of avoiding interference in the test in the event that the lid undergoing test be embossed with ornamentation or lettering at its center. In all other respects, the interior mechanism of the modified form of device illustrated by Fig. 12, is identical with the mechanism illustrated by Figs. 9, 10 and 11.

The bodies in these several views may be provided with tripod feet 53 corresponding to those indicated at 30 and 40 of Figs. 1 and 5, for the purpose of ensuring a firm setting of the body upon the lid near its outer margin. If desired, the exterior of the body may be roughened to provide a gripping surface.

As previously mentioned herein, the body of the device may be constructed principally of plastic material, or such other material as will withstand abuse and the deteriorating effects of acid, caustic, and other corrosion inducive materials ordinarily encountered in the canning or packing of foods to be preserved.

It may be noted also, that the several forms of device disclosed herein are exemplary only, wherefore, various modifications and changes may be made in the structural details, within the scope of the appended claims, without departing from the spirit of the invention.

What is claimed is:

1. In a device to test a vacuum packed commodity for its keeping qualities within a container closed by a flexible lid having a marginal seal upon the mouth of the container, the combination which comprises a cylindrical body of lesser diameter than the lid, said body having a flat top surface and an upright bore therein, and supporting means on the body to contact the lid near its relatively inflexible margin, a slidable plunger in the body bore having a head end, and a contact end to rest upon the lid at a point of substantial flection of the lid, the height of the body and the length of the plunger being so dimensioned that the head end of the plunger assumes different elevations above and beneath the level of the top surface of the body, depending upon the value of the vacuum acting upon the lid to render it concave.

2. In a device to test a vacuum packed commodity for its keeping qualities within a container closed by a flexible lid having a marginal seal upon the mouth of the container, the combination which comprises a cylindrical body of lesser diameter than the lid, said body having a flat top surface and an upright bore therein, and supporting means on the body to contact the lid near its relatively inflexible margin, a slidable plunger in the body bore having a head end, and a contact end to rest upon the lid at a point of substantial flection of the lid, the height of the body and the length of the plunger being so dimensioned that the head end of the plunger will drop to an elevation beneath the level of the top surface of the body, when the device is applied to a concave lid, the edges of the plunger head and the upper extremity of the bore being sharp, whereby the sense of touch may be utilized in determining the plunger elevation and consequently the concavity of the lid.

3. In a device to test a vacuum packed commodity for its keeping qualities within a container closed by a flexible lid having a marginal seal upon the mouth of the container, the combination which comprises a cylindrical body of lesser diameter than the lid, said body having a flat top surface and an upright bore therein incorporating a feeler edge, and supporting means on the body to contact the lid near its relatively inflexible margin, a slidable plunger in the body bore having a head end, and a contact end to rest upon the lid, the height of the body and the length of the plunger being so dimensioned that the head end of the plunger bears slightly different elevations above and below the feeler edge of the body, depending upon the value of the vacuum acting upon the lid to render it concave, the contact end of the plunger being offset relative to the vertical axis of the body so as to contact the lid at a point removed from the lid center.

4. In a device to test a vacuum packed commodity for its keeping qualities within a container closed by a flexible lid having a marginal seal upon the mouth of the container, the combination which comprises a cylindrical body of lesser diameter than the lid, said body being in the form of a substantially vertically apertured block including supporting means to contact the lid near its relatively flexible margin, the top face of the block being substantially flat about the upper edge of the aperture, a freely slidable plunger in the aperture having an upper substantially flat end, and a lower end to abut the container lid, means associated with the plunger to limit sliding movement of the plunger within the aperture, from an elevated position at which the upper end thereof extends slightly above the block, to a position at which said upper end retracts below the level of the top face of the block, for indicating a desired concavity of the lid through the sense of touch at the upper end of the aperture and the plunger.

5. In a device to test a vacuum packed commodity for its keeping qualities within a container closed by a flexible lid having a marginal seal upon the mouth of the container, the combination which comprises a cylindrical body of lesser diameter than the lid, said body being in the form of a substantially vertically apertured block including supporting means to contact the lid near its relatively flexible margin, the top face of the block being substantially flat about the upper edge of the aperture, a freely slidable plunger in the aperture having an upper substantially flat end, and a lower end to abut the container lid, means associated with the plunger to limit sliding movement of the plunger within the aperture, from an elevated position at which the upper end thereof extends slightly above the block, to a position at which said upper end retracts below the level of the top face of the block, for indicating a desired concavity of the lid through the sense of touch at the upper end of the aperture and the plunger, said plunger being located in offset relationship to the vertical axis of the body of the device thereby to make contact with the lid at a point removed from the lid center.

6. In a device to test a vacuum packed commodity for its keeping qualities within a container closed by a flexible lid having marginal seal upon the mouth of the container, the combination which comprises a cylindrical body of lesser diameter than the lid, said body having a flat top surface and an upright bore therein, and supporting means on the body to contact the lid near its relatively inflexible margin, a slidable plunger in the body bore having a head end, and a contact end to rest upon the lid at a point of substantial flection of the lid, the height of the body and the length of the plunger being so dimensioned that the head end of the plunger will drop to an elevation beneath the level of the top surface of the body, when the device is applied to a concave lid, the edges of the plunger head and the upper extremity of the bore being sharp, whereby the sense of touch may be utilized in determining the plunger elevation and consequently the concavity of the lid, said plunger being located in offset relationship to the vertical axis of the body of the device thereby to make contact with the lid at a point removed from the lid center.

PHILIP HOFFMAN.

REFERENCES CITED

The following references are of record in the file of this patent:

UNITED STATES PATENTS

| Number | Name | Date |
|---|---|---|
| 429,144 | Miner | June 3, 1890 |
| 579,573 | Goff | Mar. 30, 1897 |
| 1,093,307 | Becker | Apr. 14, 1914 |
| 1,314,888 | Mitchell | Sept. 2, 1919 |
| 1,476,904 | Malmquist | Dec. 11, 1923 |